United States Patent [19]

von Bogdandy et al.

[11] 4,357,160

[45] Nov. 2, 1982

[54] PROCESS FOR IMPROVING THE USE OF HEAT IN STEEL PRODUCTION FROM SOLID IRON MATERIAL

[75] Inventors: Ludwig von Bogdandy, Oberhausen-Sterkrade; Karl Brotzmann, Sulzbach-Rosenberg, both of Fed. Rep. of Germany

[73] Assignee: Klöckner-Werke AG, Duisburg, Fed. Rep. of Germany

[21] Appl. No.: 215,070

[22] Filed: Dec. 10, 1980

[30] Foreign Application Priority Data

Dec. 11, 1979 [DE]  Fed. Rep. of Germany ....... 2949803

[51] Int. Cl.$^3$ .............................................. C21C 7/00
[52] U.S. Cl. .......................................... 75/60; 75/51; 75/52; 75/59
[58] Field of Search .......................... 75/60, 59, 51, 52

[56] References Cited

U.S. PATENT DOCUMENTS

| 3,953,199 | 4/1976 | Michaelis | 75/60 |
| 4,089,677 | 5/1978 | Spenceley | 75/51 |
| 4,195,985 | 4/1980 | Brotzmann | 75/60 |
| 4,198,230 | 4/1980 | Brotzmann | 75/60 |

*Primary Examiner*—P. D. Rosenberg

*Attorney, Agent, or Firm*—Watson, Cole, Grindle & Watson

[57] ABSTRACT

A method of heating solid, iron-containing materials in a steel-making converter which includes one or more injection nozzles in a lower nozzle plane and one or more injection nozzles in an upper nozzle plane, the nozzles in each plane being capable of supplying carbonaceous fuels and/or oxygen gas into the converter; the method including supplying fluid carbonaceous fuels (oil and/or gas) and oxygen gas through all the injection nozzles to the interior of the converter so that the fuels will burn and preheat the solid, iron-containing materials, these materials eventually forming a melt at the bottom of the converter; stopping the supply of fluid carbonaceous fuels and instead supplying pulverized carbonaceous fuels through the injection nozzles in the lower nozzle plane once the formed melt has a sufficient depth that it contacts the injection nozzles in the lower nozzle plane, stopping the supply of fluid carbonaceous fuels through the injection nozzles in the upper nozzle zone and the supply of pulverized carbonaceous fuels through the injection nozzles in the lower nozzle zone once the formed melt has a sufficient depth that it contacts the injection nozzles in the upper nozzle zone, and supplying oxygen gas (with from time to time, carbonaceous fuels) to the melt from all the nozzles.

9 Claims, No Drawings

PROCESS FOR IMPROVING THE USE OF HEAT IN STEEL PRODUCTION FROM SOLID IRON MATERIAL

The invention relates to a process for improving the use of heat in steel production from solid iron material, such as for example, scrap or pre-reduced iron-ores (iron pellets, iron briquets, iron sponge) in a converter, which has devices for the supply of oxygen above and below the surface of the bath, as well as by way of fuel injection nozzles in the area of the steel bath.

The steel production from solid material used may be carried out in the converter by the process according to the German OS 28 16 543. The essential features of this known invention consist in that first the solid iron bearers, mainly scrap, charged into the oxygen blower converter are preheated and at the same time the nozzles disposed in the lower area of the converter are operated as oil or gas/oxygen burners. As soon as there is a melt in the converter the bath is fed energy with carbon-containing, powdery fuel, mainly powdered coke and oxygen.

The carbon introduced into the melt is burned with the oxygen into CO, and the degree of effectiveness related to heat engineering and to complete combustion into $CO_2$ amounts to about 17%.

The German patent application P 28 38 983.5, not yet published, "Process for the supply of heat in steel production in the converter" points a way for raising the degree of effectiveness for heat engineering of the carbon fed to the melt, up to about 30%, related to complete combustion. The essential characteristic of this invention consists in that oxygen is fed to the bath in the converter both below and above the surface of said bath. Up to 80% of the entire oxygen volume are blown as a free jet onto the bath, and thus heat may be supplied to the bath from the secondary CO-combustion. The use of these two processes permits the profitable production of steel from solid iron bearers in the converter. In the case of its use in operation it turned out however, that at the time when the first melt is formed in the converter, i.e., during the development of the sump from entirely or partly molten iron bearers, the use of heat of the supplied fuels fluctuates greatly and is generally lower than in other phases of the process. The heat engineering degree of effectiveness of the supplied fuels is unfavorable in this sump-building phase in the converter both during the operation of the burner with gaseous or liquid hydrocarbons as well as during introduction of solid, ground, carbon-containing fuels. The high utilization of heat of the gaseous or liquid hydrocarbons, as it results in the case of pure pre-heating, does no longer occur, since these fuels are apparently converted to a greater part still only into carbon monoxide and hydrogen without a noticeable gain in heat, as soon as molten iron is in front of the nozzles. The powdery coal is probably blown for the greater part and as long as there is no sufficient depth to the bath, through the partly liquid sump and is not absorbed by the melt, as is the case when the bath has sufficient depth.

Consequently, the present invention set itself the task of creating a process of the initially mentioned type which avoids the disadvantages of the known processes and particularly in the phase when the first melt is formed, i.e., during the development of the sump in the converter from wholly or partly molten solid iron materials, to improve the use of the heat of the supplied fuels in order thus to raise the profitability of the entire process.

This task is solved according to the invention by at least two nozzles being disposed at variable levels in the lateral wall of the converter in the area of the steel bath in such a way, that these nozzles are operated in the steel bath area as oil- and/or gas oxygen burners during the pre-heating time of the solid iron materials, and after the melt has reached the lower nozzle (s) they are switched over to the blowing-in of pulverized, carbon containing fuels and oxygen, and whenever the melt has reached the upper nozzles, oxygen and at least from time to time carbon containing fuels are introduced with the nozzles in the area of the steel bath, into the melt.

A further characteristic of the invention consists in the fact that mostly with the start of the oxygen supply into the melt below the surface of the bath, oxygen is blown simultaneously as a free jet onto the melt. The blowing-on of oxygen may be accomplished either through nozzles which are built in to the upper part of the converter, or else a water cooled oxygen blow lance may be used.

According to the invention the lower nozzles are built in into the fire-resistant lining of the converters lateral wall about 10 to 50 cm above the converter bottom free of nozzles, and the nozzles lying above them about 50 to 150 cm above it. The position of the build-in is about horizontal and about below the converter pivots in relation to the blowing position of the converter. By steel bath area one understands the converter volume, which in blowing position of the converter is occupied by the completely refined steel melt.

The method of operation of the nozzles in the area of the steel bath is divided according to the process of the application into three phases. In the first phase, the preheating of the iron material, for example scrap, charged into the converter, the nozzles are operated in a known manner as burners, and the hot combustion gasses flow from below to the top through the scrap heap. For example, heating oil or natural gas are used as fuels. The liquid and/or gaseous fuels are burned with oxygen in an approximately stoichiometric ratio to $CO_2$ and $H_2O$. The burner operation of the nozzles in the lower construction plane terminates, as soon as the height of the sump in the converter covers the nozzles apertures.

The second phase of the operational method of the nozzles, the melting phase, follows. The nozzles of the lower construction plane are switched to the blowing in of carbonaceous fuels and oxygen. The introduced quantity of oxygen corresponds approximately to the value required for the Co combustion of the blown-in carbonaceous fuels, or is slightly above it. The horizontal nozzle arrangement at the same time offers the advantage, that fed-in powdery carbon is not blown through the bath, but dissolves in the melt and burns with the oxygen to carbon monoxide while obtaining heat. The nozzles in the second construction plane continue to operate in this phase as burners.

Whenever their exit apertures too are reached by the melt, then the third phase of the nozzle operation follows. This period is characterized as the refining phase. The nozzles in both construction planes of the steel bath area now serve for the oxygen supply and at least from time to time for the introduction of the carbonaceous fuels until the entire fuel volume is fed into the melt. At the end of the steel production phase only oxygen may still be introduced through both groups of nozzles.

In the steel bath area, the nozzles are provided with a medium protective encasing as a protection against premature back-burning. As a protective medium for nozzles, preferably hydrocarbons are used. However, it has proven itself to use nitrogen, carbon dioxide and/or an inert gas, for example, argon as a nozzle protection medium, especially toward the end of refining for the reduction of the hydrogen contents in the steel.

It is within the sense of the invention to use the so-called ring-slit nozzles as in the German patent 24 38 142 in the steel bath area. The ring-slit nozzles have the advantage that the jet of gas emerging from them has a considerably shorter range and that one will thus prevent the fire resistant lining of the opposite lateral wall from being damaged. In the center of the ring slit nozzle, an additional introducing pipe may also be attached, through which the substances that are to be blown in, for example coal dust or slag former, such as chalk are fed to the melt.

According to the invention it turns out to be advantageous to use one or more ring-slit nozzles in the lower construction plane in the lateral wall of the converter which serves for the supply of both the powdery carbonaceous fuels and oxygen. However, one may also use, the customary nozzles always from two concentric pipes. One of these nozzles is then operated with carbonaceous fuels and the other with oxygen. The distance between the nozzles apertures of these two nozzles is not to be selected too large, for example, about 50 cm, so that the fed-in reaction partners would even interact in the not yet completely molten sump and deliver heat to the bath as a result of which the sump is quickly molten further.

According to another development of the invention, a combination of ring-slot nozzles and customary nozzles from two concentric pipes has also proven itself. For example two ring-slot nozzles are disposed oppositely in a 60 t converter about 50 cm above the converter bottom. These ring-slot nozzles are operated corresponding to the described, three-phase method of operation. Related to the total steel producing time in the converter, this means that they function about in the first half as burners and in the second half as oxygen-introducing nozzles. Below one of the two ring-slot nozzles about 10 cm above the bottom there are two nozzles of concentric pipes, at a distance of 40 cm. Approximately during ¼ of the total steel producing time, these nozzles, operate as burners. Then powdery carbon is conducted through one of the nozzles and oxygen through the other. At the time when the ring-slot nozzles are switched from oxygen, powdered carbon is fed to the melt through both double pipe nozzles. Approximately during the last 5 minutes of the refining phase all four nozzles serve for the supply of oxygen.

While, according to the invention the two construction planes of the nozzles in a 60 t converter, as described, lie in the steel bath area at 10 and 50 cm, the corresponding construction heights in a 300 t converter amount to 15 and 120 cm.

Another characteristic of the present invention consists in keeping the floor level in the converter approximately constant. To be sure the wear of the floor lining in case of use of the process of the invention is very low, since no nozzles are built in the floor any more, but as soon as a noteworthy wear for example, of 5 to 10 cm, does occur, the old floor level must be rebuilt to the starting level by injecting of fire-resistant masses, sintering-in of fire resistant substances or possibly by "slagging-in" practice, so that the nozzles in the steel bath area will remain about at the same level above the floor. It may also be effective to increase the thickness of the floor in the course of the use of the converter, in order that in case of a progressive wear of the converter wall lining, approximately comparable quantities of liquid melt will be in the converter.

Subsequently the invention will be explained in more detail on the basis of a non-limiting example.

The process of the invention is used in an oxygen blow-through converter with a steel producing capacity of 60 t per charge. In its newly bricked up state, the converter has an interior volume of about 50 m$^3$ with an inside diameter of 4.20 m in the cylindrical part and an inside height of 4.90 m. Viewed at a vertical position of the converter, lateral wall nozzles are mounted below the converter pivots.

The two lower nozzles lying side by side at a distance of 40 cm are at a level of 15 cm and the two opposite nozzles above that at a level of 55 cm above the converter floor. These four nozzles always consist of two concentric pipes, whereby the inner pipe has an inside diameter of 36 mm and serves alternately for the supply of oxygen and for the introduction of a coke powder nitrogen-suspension. Light heating oil in case of the burner operation and propane as a protective agent for the nozzles is conducted during blowing-in of oxygen through the annular gap between the two concentric pipes with a width of 1.5 mm.

Beside the above mentioned nozzles in the steel bath area, there is an oxygen inflation nozzle of 54 mm diameter in the upper converter cone, the so-called converter hat. The construction position of this nozzle is above the converter pivot, 1 m below the converter lip ring. The nozzle is aligned at about 60° from the horizontal directly with the center of the steel bath. The nozzle aperture is about 3.50 m above the bath level of the completed steel melt.

80 t of iron in the form of solid iron materials, mainly scrap of variable quality and/or iron pellets, iron sponge, iron briquets or comparable substances are charged into this converter. During the charging process, nitrogen flows through the central pipes and annular gaps of the nozzles in the steel bath area in order to keep the nozzle channels open. The volume of flow is 6000 $\mu$m$^3$/h. The oxygen inflation nozzle in the converter hat is fed for the same reason during the charging time likewise nitrogen and at a flow rate of 2000 $\mu$m$^3$/h.

After the charging process the converter is brought into blowing position, and in 15 minutes 1100 l of light heating oil flow through the four nozzles in the steel bath area through the annular gaps and 2200 $\mu$m$^3$ oxygen through the central pipes. During this time all four nozzles are operated as burners for preheating the scrap. During this time a volume of 2000 $\mu$m$^3$/h of air flows through the oxygen inflation nozzle in the converter hat and 20 $\mu$m$^3$/h of nitrogen through the annular gap. From the 15th to the 20th minute, 1000 k ground coke in suspension with 70 $\mu$m$^3$ nitrogen is blown through one of the two nozzles in the steel bath area into the melt formed in the converter. The two nozzles lying above that are still operated as burners with the stated oil/oxygen blowing rates. 6000 $\mu$m$^3$ per hour of oxygen flow through the oxygen inflation nozzle and related to this blowing rate, 1% nitrogen flows through the annular gap.

After a total processing time of 20 minutes, the two upper lateral wall nozzles, operated up to that time as burners, are switched over to oxygen supply in the steel bath area. Then 12,000 $\mu m^3/h$ of oxygen flow through the central pipes of these two nozzles, related to the oxygen blow rate about 2% propane flows through the annular gaps for the protection of the nozzles. The oxygen is charged with ground lime (CaO) for the formation of slag. The two lower nozzles in the steel bath area then both serve for the conveyance of coke; the rate of conveyance amounts to 400 kg/min.

After a melt-in and heating time of 30 minutes, the melt in the converter has an approximate carbon content of 3%, and the refining phase of 6 minutes follows. During the refining phase 12000 $\mu m^3/h$ of oxygen with or without a charge of lime is introduced through the nozzles into the iron bath. The oxygen blow-up rate amounts to 6000 $\mu m^3/h$ and the entire supplied quantity of lime to 4 t.

After that the finished 60 t of steel melt at a temperature of 1640° C. and a composition of 0.03% C, 0.1% Mn, 0.020% P is tapped.

It is within the sense of the invention, possibly during the last 1 to 2 minutes of the refining time, preferably during the after blow period, which follows the preceeding analysis determination, to use inert gasses, for example, argon for the protection of the nozzles, in order to adjust very low nitrogen and hydrogen contents in the steel.

We claim:

1. A method of heating solid, iron-containing materials in a steel-making converter which includes a floor, a side wall, at least one injection nozzle extending through the side wall in a lower nozzle plane and at least one injection nozzle extending into the converter in an upper nozzle plane, said method comprising the steps of
   (a) introducing a sufficient amount of solid, iron-containing materials into the converter that when formed into a melt bath in the converter the injection nozzles in both the lower and upper nozzle planes will be located below the surface of the bath,
   (b) supplying a fluid carbonaceous fuel and oxygen gas through the injection nozzles in both the lower and upper nozzle planes to burn within the converter and thereby preheat the iron-containing materials,
   (c) continuing step (b) until a bath of melt is formed in the converter of sufficient depth that its surface contacts the injection nozzles in the lower nozzle plane,
   (d) subsequent to step (c), supplying a powdered carbonaceous fuel and oxygen gas through at least one of the injection nozzles in the lower nozzle plane such that the fuel will be injected into the melt in the converter and burn, while at the same time continuing to supply fluid carbonaceous fuels and oxygen gas through the injection nozzles in the upper nozzle plane to burn in the converter,
   (e) continuing step (d) until the formed melt bath in the converter has sufficient depth that its surface contacts the injection nozzles in the upper nozzle plane,
   (f) subsequent to step (e), supplying exclusively oxygen gas through all of the injection nozzles to help complete the combustion of the fuels supplied to the converter.

2. The method as defined in claim 1, wherein said fluid carbonaceous fuels are selected from the group consisting of heating oil and natural gas.

3. The method as defined in claim 1, wherein said powdered carbonaceous fuel is powdered coal.

4. The method as defined in claim 1, wherein said solid iron-containing materials are selected from the group consisting of iron pellets, iron briquettes and sponge iron.

5. The method as defined in claim 1, wherein said lower nozzle plane is located between about 10 and 40 cm from the floor of the converter such that step (b) is continued until the formed melt is between 10 and 40 cm in depth.

6. The method as defined in claim 5, wherein said upper nozzle plane is located between about 50 and 150 cm from the floor of the converter such that step (d) is continued until the formed melt is between 50 and 150 cm in depth.

7. The method as defined in claim 1, wherein between step (e) and step (f) both oxygen gas and intermittently carbonaceous fuels are supplied through all the injection nozzles.

8. The method as defined in claim 1, wherein an oxygen gas jet is concurrently blown against the melt surface during steps (d)–(f).

9. The method as defined in claim 1, wherein the converter includes two injection nozzles in the lower nozzle plane and two injection nozzles in the upper nozzle plane such that during step (b) four streams of fluid carbonaceous fuels are burned within said converter.

* * * * *